United States Patent [19]
Peng

[11] Patent Number: 5,559,319
[45] Date of Patent: Sep. 24, 1996

[54] OSCILLATION BAR CODE READER

[75] Inventor: Ke-Ou Peng, 2612 kv. Delft, Netherlands

[73] Assignee: Opticon Sensors Europe BV, Netherlands

[21] Appl. No.: 361,481

[22] Filed: Dec. 22, 1994

[30]     Foreign Application Priority Data

Dec. 24, 1993 [GB]  United Kingdom .................... 9326471
Jan. 20, 1994 [GB]  United Kingdom .................... 9401042

[51] Int. Cl.$^6$ ..................................................... G06K 7/10
[52] U.S. Cl. .......................... 235/462; 359/199; 359/213
[58] Field of Search ................................. 235/462, 472, 235/470; 359/199, 213, 214

[56]               References Cited

U.S. PATENT DOCUMENTS

| 5,015,831 | 5/1991 | Eastman et al. | 235/462 |
| 5,136,415 | 8/1992 | Bean | 359/213 |
| 5,281,801 | 1/1994 | Shepard et al. | 235/462 |

*Primary Examiner*—John Shepperd
*Attorney, Agent, or Firm*—Nixon & Vanderhye

[57]                ABSTRACT

A number of scanning devices are shown which are suitable for use in active or passive bar code readers. These devices use a mirror system which is arranged to oscillate for production of a scanning beam, the oscillation being at a resonant frequency and being effected and adjusted by means solely of magnetic or electro magnetic components.

8 Claims, 4 Drawing Sheets

OSCILLATION BAR CODE READER

The invention relates to oscillation bar code readers.

BACKGROUND OF THE INVENTION

Generally in a bar code reader the bar code is scanned so as to provide a time sequential optical image of the bar code and this image is then converted into an electrical signal and decoded. The scanning optics may be active or passive, that is to say a scanning beam may actively illuminate a bar code which is then read off the reflected beam or a scanning beam may act to take a time sequential optical image off a bar code having its own continuous illumination such as daylight or some form of conventional artificial illumination. The present invention is concerned with both active and passive systems.

In the simplest scanning geometry, only a single scanning line is required. The scanner is then very compact and hats been applied widely in hand-held bar code readers.

Because of the need for a large longitudinal working range and high spatial resolution, the laser beam has popularly been used for bar code reading. In most laser scanners, this beam is steered by a reflective means, such as a mirror, to the bar code. The reflective means can be facets of rotation of a polygonal mirror, driven by a conventional or an oscillation motor.

In order to achieve low power consumption, large scanning angle and compact dimensions, resonant scanning is very attractive for bar code reading. Together with mechanical elastic components, the mirror can be forced to oscillation under an alternating torque. When the resonant conditions are satisfied, the power consumption of the system will be extremely low. A bar code reader, in which an oscillating mirror with mechanical elastic components such as springs, is driven by a magnet-coil device, has been described in the European Patent Application 0,456,095. However, in practice of bar code reading, the large scan angle and high scan frequency (ratio) have been required. It leads to the failure of the mechanical elastic components and the shortage of the life time of the reader device.

The mirror can also be driven by a ferro-electric component. In order to increase the amplitude, a penta-bimorph structure has been used, such as is described in U.S. Pat. No. 4,387,297. However, this structure still offers very limited scanning angle. It is still difficult to be used directly in a bar code scanner.

Other prior art systems are disclosed in: EP 0063934 A2 (SONY), EP 0143483 A1 (PHILIPS), GB 2070832 A (SYMBOL), U.S. Pat. No. 4,664,476 A (KASUGA), U.S. Pat. No. 4,778,232 A (IRBY), U.S. Pat. No. 4,828,347 A (KEISER), U.S. Pat. No. 5,097,356 A (PAULSEN) and U.S. Pat. No. 5,107,372 A (GELBART).

The scan frequency in most of the above-mentioned scanners depend on the elastic properties of a mechanical component of the resonant system. It can be changed only if the mechanical properties of the elastic and the vibration components, such as spring and mirror, are changed. It means that only if the spring and or the mirror is replaced, can the resonant frequency be changed and the scan ratio then be modified.

On the other hand, aging and variation in environmental conditions may lead to variation in the elastic properties of the mechanical components. It leads to a possible shift of the resonant frequency, and the scan angle can then decrease if the driving frequency does not change and the system is therefore no longer acting at resonance.

In the present invention, using a new form of resonant scanning system, we present a new device which avoids using conventional mechanical elastic components. Based upon these devices, compact bar code readers can be produced which offer a large scan angle and high scan ratio or frequency.

OBJECT OF THE INVENTION

The objects of the present invention are as follows:

1. to introduce a simple bar code scanning device which can produce a single line with lower power consumption, combined with a large scan angle and long usage time;

2. to introduce a simple bar scanning device, working in a resonant condition with controllable oscillation frequency;

3. to develop bar code readers using said devices to perform single or multiple directional scanning.

SUMMARY OF THE INVENTION

In accordance with the present invention, there is provided a bar code reader comprising optical scanning means which is arranged to provide an optical image of a bar code by means of an optical beam, and includes optical beam deflecting means which is arranged to oscillate at a resonant frequency so as to deflect the optical beam in a scanning motion to provide the optical image of the bar code, light detecting means by which the optical image of the bar code can be received and formed into an electrical signal, and decoding means for decoding the electrical signal, the said optical beam deflection means comprising magnetic force applying means and magnetic restorative means which are arranged to act against each other to provide oscillation and at least one of which is arranged to deflect the beam in said scanning motion and magnetic means for adjustment of the resonant frequency of oscillation.

In these devices, the optical beam deflecting means can be a reflective means used to steer an incident beam. This reflective means can be a mirror, prism or holographic component.

The reflective means can be installed to the housing (frame) by means of, at least, one bearing, such that this reflective means can rotate around an axis.

This reflective means is subject to two torques; the driving torque, generated by the magnetic force applying means and the elastic restorative torque, arising from the magnetic restorative means. Under these two torques this reflective means can oscillate about its axis.

A particular feature is that the mirror having an elastic magnetic element can be forced to oscillate at a controllable resonance frequency by an electro-magnetic torque.

To drive the reflective means, a magnet(s) that is most preferred to be permanent magnet(s), is fixed to this reflective means and distanced from the vibration axis. This magnet is called moving driving magnet. Facing to it, the stationary coil(s) is situated in the housing. Feeding alternative current to the coil(s), the electromagnetic force will be generated and the mirror can, then, be forced to oscillate around the above-mentioned axes.

Alternatively, a coil(s) is fixed to the reflective means and distanced from the vibration axis. Facing to it, the stationary magnet(s), that is most preferred to be permanent magnet, is situated in the housing. Feeding alternative current to the moving coil(s), the electromagnetic force will be generated and the reflective means can, then, be forced to oscillate.

The elastic torque in the present invention may be generated by a so-called magnetic spring, consisting of stationary and moving magnets. These magnets are most preferred to be permanent magnets. The moving magnet(s), fixed to the reflective means, is situated between the two stationary magnets. Under the magnetic forces between the stationary and moving magnets, the moving magnet is kept at the equilibrium position. When it is displaced from this position, the elastic torque will occur and it pushes this magnet to its equilibrium position. The elastic torque will increase with the increasing displacement. This increase results from the variation in the magnetic force between them and/or the variation in the distance of the moving magnet to its equilibrium plane.

The so-called magnetic spring or restorative means can be achieved by a number of different arrangements, three examples are:

a) a combination of two fixed coils and a movable coil between them.

b) a combination of two fixed coils and a movable permanent magnet between them.

c) a combination of two fixed permanent magnets and a movable permanent magnet between them.

According to this, we introduce two embodiments for the oscillation devices.

In the first embodiment, the moving magnet in the elastic unit, distanced from the vibration axis, is placed between the two permanent magnets with its poles facing those of the stationary magnets with the same signs. In other words, the north pole of the moving magnet faces the north pole of the stationary magnets, while its south pole, the south pole. The repulsion forces between them will push the moving magnet to its equilibrium position. When it moves out from this position along the direction of the magnetic field of the stationary magnets, the magnetic force, in turn the elastic torque, will be changed because of the variation in the distance between them.

In the second embodiment, the rotation axis of the moving magnet in the elastic unit is coincident with the vibration axis of the reflective means. This magnet appears between the two stationary magnet with its poles facing those of the stationary magnets with the opposite signs. The north pole of the moving magnet faces the south pole of the stationary magnet, while its south pole, the south pole. The attraction forces between them will keep the moving magnet in its equilibrium position.

When the reflective means rotates out from this position in the direction, normal to the magnetic field of the stationary magnets, the distance to its equilibrium position, in turn the magnetic torque will be changed accordingly.

Under these two torques, the reflective means will be forced into vibration. The natural resonant frequency is given by $$W_n = \sqrt{\frac{K_m}{I}}$$

where I represents the moment of inertia of the vibrating part, including the reflective means, driving and moving magnets, etc; and $K_m$ is the elastic constant for the magnetic spring, depending on the magnetic property of magnets.

The maximum scan angle and minimum energy consumption of the scanning device will arrive if the driving force varies at a frequency which is identical to the resonant frequency.

As shown in the above equation, the resonant frequency depends on the elastic constant of the magnetic spring. This constant frequency will vary if the magnet field is changed. An additional coil is now wound around the stationary magnets. The magnetic field between the stationary and moving magnets, as the sum of the magnetic fields, generated separately by the coil and stationary magnets, can, then, be varied according to the current, feeding into this additional coil. By control of this current, the resonance frequency can then be modified.

There are several practical combinations of coils and magnets which enable the resonant frequency to be adjusted, for example where the restorative unit is two electro magnetic coils with a permanent magnet between them the frequency is adjusted by adjusting the current, or where three permanent magnets are used as the restorative unit, an additional coil is provided and the current in it is adjusted.

The scan angular amplitude depends on the damping (loss). The loss may depend on the scan speed, in turn, the resonant frequency. For incidence, the windage will increase with the increasing speed. For high frequency scanning, the scan angle is decreased. In order to increase the scan angle, penta-structure of mirrors can be used. It is, in fact, a combination of two oscillation systems. In this device, two mirrors, oscillating around one or two parallel oscillation axes, are used. The incident beam impinges at the first mirror and, then to the second mirror. The angle between the beam, incident to the first mirror, and the beam, emerging from the second mirror, depends on the angle between the two mirrors. The two systems have the identical resonant frequency. In the case that the two mirrors oscillate in the two opposite directions, i.e. one of them rotates in the clock-wise direction, another mirror will then rotate in the counter clock-wise direction, the scan angle will then increase. For a symmetrical system, the scan angle will be 4 times the angular deviation between the two mirrors.

In the above-mentioned devices, the permanent magnets can be replaced by electric magnets with coils, in which direct current is fed.

The above-introduced scanning devices can be used for bar code reading.

In active geometry, a thin pencil beam, such as a laser beam, is used to scan a bar code and light, scattering from it, is detected to obtain information contained in code. To form such a thin beam, a focusing optics has been used. The above-mentioned device can be used to steer this thin beam to scan a bar code. With additional optical components, such as a mirror array, multiple-directional reading can be performed. In this case, a bar code can be read even if it is orientated in various different directions.

In passive geometry, the bar code in ambient light with or without additional illumination is imaged onto a photosensor. Moving the image of bar code, through a small opening, the code signal can be detected. The above mentioned scan devices can be used to move the bar code image.

DETAILED DESCRIPTION OF THE PREFERRED EMBODIMENTS OF THE INVENTION.

1. Scanning Devices 1-1, First embodiment of the scanning device

In this embodiment, the magnetic spring (the word spring being used figuratively to indicate a magnet behaving like a mechanical spring) is out of the oscillation axis and the moving magnet varies its distance to the stationary magnets during oscillation.

Figure 1A:
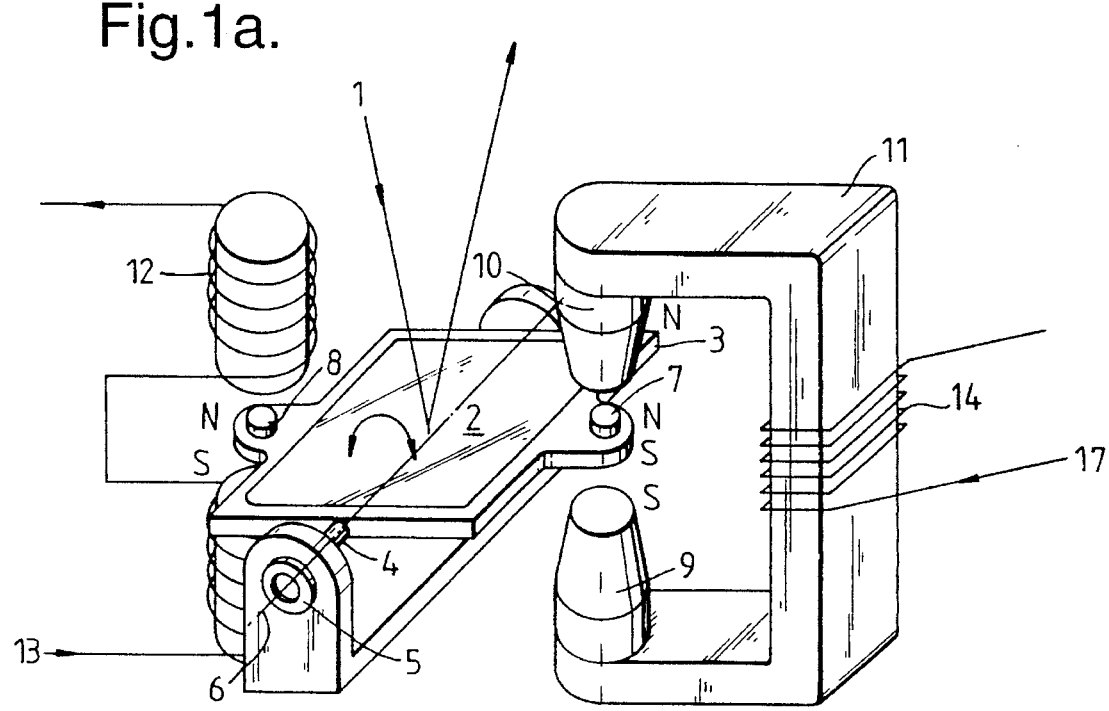
FIGS. 1a and 1b show a first embodiment of a scanning device, the first figure being a perspective view and the second being diagrammatic.
Figure 1B:
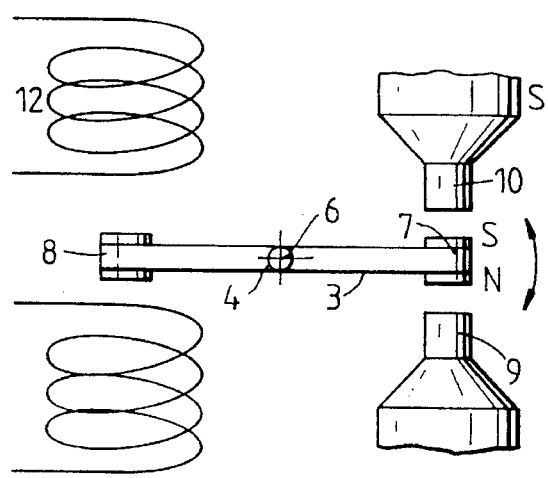

As shown in FIGS. 1a and 1b, an incident beam 1 is incident on a mirror 2, that is fixed in a holder 3. The holder 3 is carried by a shaft 4 mounted in bearings 5, so that the mirror 2 can rotate about an axis 6. Two permanent magnets, 7 and 8 are fixed on this holder and distanced from the rotation axis 6. The magnet 7 is situated between the stationary magnet poles 9 and 10, such that its north pole faces the north pole of the stationary magnet. The two magnet poles are connected to each other by a soft iron base 11. The magnetic force between the stationary and moving magnets force the moving magnet 7 to its equilibrium position. The other magnet 8 is situated in an electro-magnetic field, generated by an electro magnetic coil or coils 12. An alternating current 13 is fed into the coil or coils 12. The magnet 8 is driven by the alternative electromagnetic force, resulting from the coil 12. The mirror 2 is forced to drive away from its equilibrium position by the torque from the magnet 8. Combining the driving and elastic resistive torques, the mirror oscillates. When the frequency of the driving current is matched to the resonant frequency of the elastic system, the amplitude of vibration will arrive at its maximum with minimized power consumption.

Figure 2A:
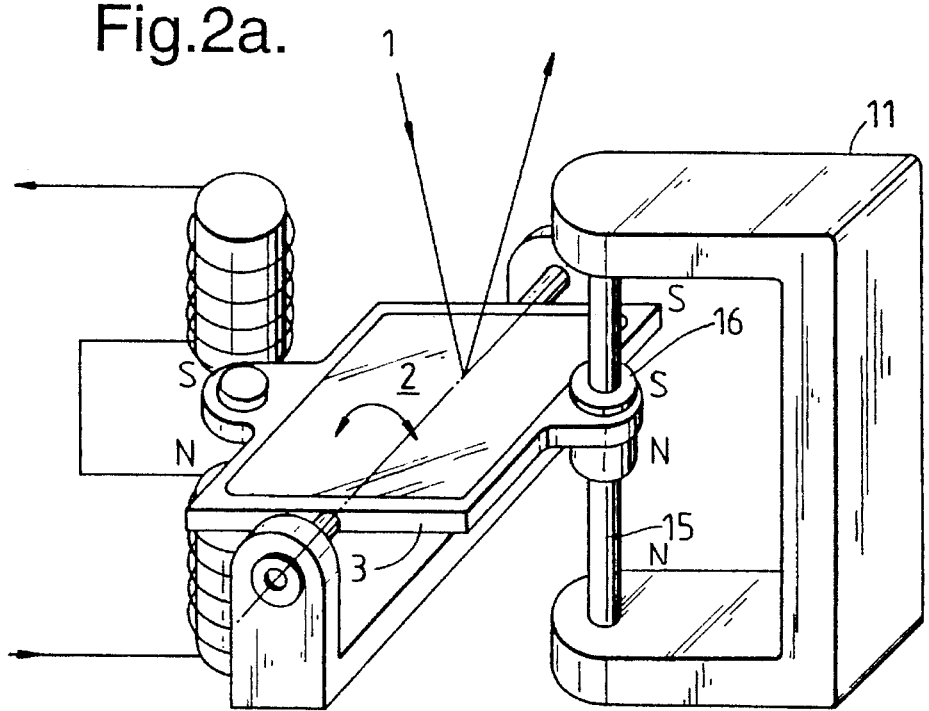
FIGS. 2a and 2b show a modified version of the first embodiment of a scanning device, the first figure being a perspective view and the second being diagrammatic.
Figure 2B:
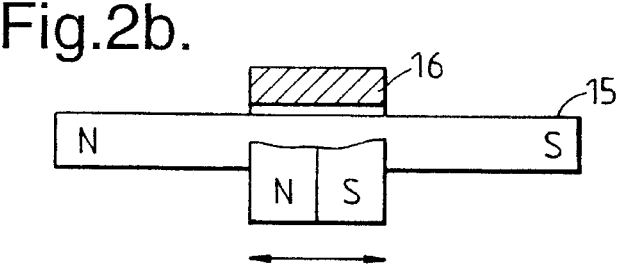

The magnet spring in this device can be modified. As shown in FIG. 2, instead of the stationary magnet poles 9 and 10, a single bar-shaped magnet, 15, is used. The magnet 7 is replaced by a magnetic ring 16. The magnet bar 15 passes through the ring 16, such that the poles of the bar and the ring are in the same direction. Under the magnetic forces between them, the ring tends to be kept in the mid-position of the bar, i.e. the equilibrium position. The base 11 in this device is non-ferric material.

1-2, Second embodiment of the scanning device

Figure 3A:
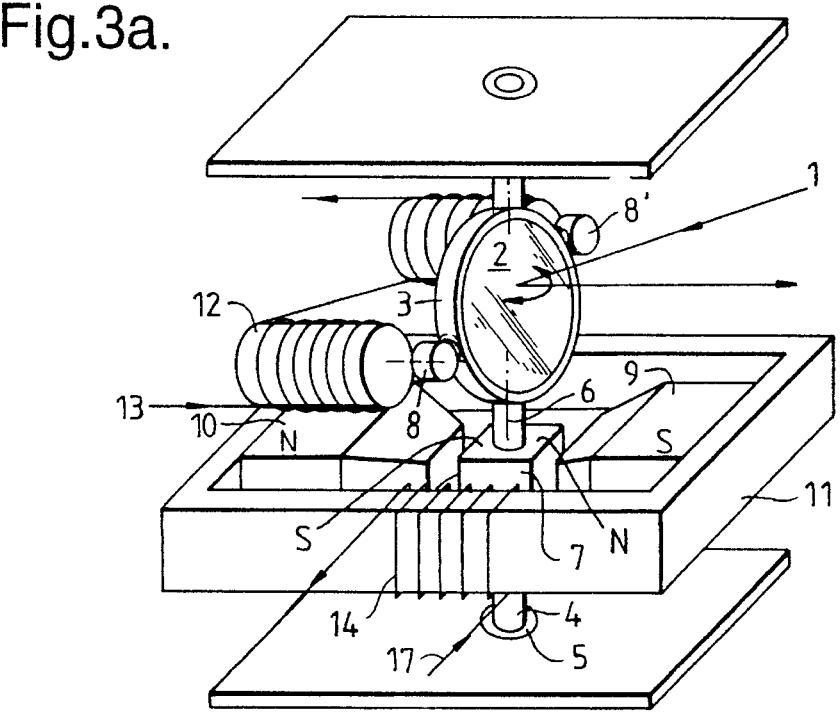
FIGS. 3a and 3b show a second embodiment of a scanning device, the first figure being a perspective view and the second being diagrammatic.
Figure 3B:
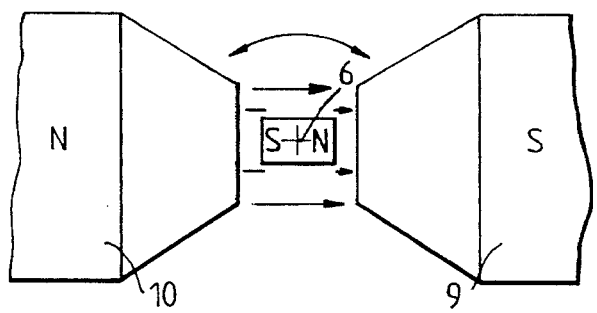

In this embodiment which is shown in FIG. 3a and 3b, the magnetic spring is at the oscillation axis and the moving magnet rotates around this axis during oscillation.

In FIG. 3, the light 1 is incident on the mirror 2, that is fixed in the holder 3. By means of the shaft 4 of the holder 3 and the bearing 5, the mirror 2 can rotate around the axis 6. Two sets of permanent magnets, 8 and 8', are fixed on this holder. The moving magnet 7 is situated between the stationary magnets 9 and 10, such that its north pole faces the south pole of the stationary magnet and its centre is at the rotation axis. The two magnets are connected to each other by the soft iron frame 11. The magnetic force attract the moving magnet 7 to its equilibrium position. Another set of magnet(s), 8' is distanced from the oscillation axis and situated in the electro-magnetic field, generated by the coil(s) 12. When the alternating current, 13, is fed into the coil(s) 12, the alternating electro-magnetic torque will be generated to push the mirror 1 away from its equilibrium position. Combining the driving and elastic resistive torques, the mirror can oscillate. When the frequency of the driving current is matched to the resonant frequency of the elastic system, the scan angle will arrive at its maximum and the power consumption is minimized.

To control the resonance frequency, additional coils, 14, are wound around the stationary magnets, 9 and 10, or their base 11, in FIG. 1 or 3. When the driving current is adjusted to another frequency, the direction and amplitude of the current, 17, fed into the coils, 14, will be adapted such that the elastic constant of the magnetic spring is matched to this re-defined frequency.

The scanning electronics depends on the required resonant frequency. The forcing current is most preferred to have constant frequency. Due to aging, wearing of components, such as bearing, and variation of environmental conditions, the resonance conditions may be changed. This change may lead to variation in resonant frequency. The scan field may be decreased. By means of an additional magnetic field, generated by the coil 14, this change can be removed. The moving of the magnet, 8, with respect to the coil 12, will generate a signal in this coil. Corresponding to the large displacement of this magnet, the signal is also large. The direction and amplitude of the current, 17, fed into the coils, 14, around the magnet spring can be automatically adapted according to the signal in the coil 12 until the maximum displacement (resonance) of the moving magnet, 8, is achieved. The resonance can then be stabilized.

Other scan amplitude detection technology can also be used here to control the current in the coil 14 such that the resonant frequency of the system is matched to the forcing frequency.

1-3 Angular amplifiers

As we mentioned before, the scan angular amplitude depends on the damping loss. The large loss, often appearing for high scan frequency, leads to the decrease of the scan angle. In our invention, an angular amplifier can also be incorporated.

Figure 4:
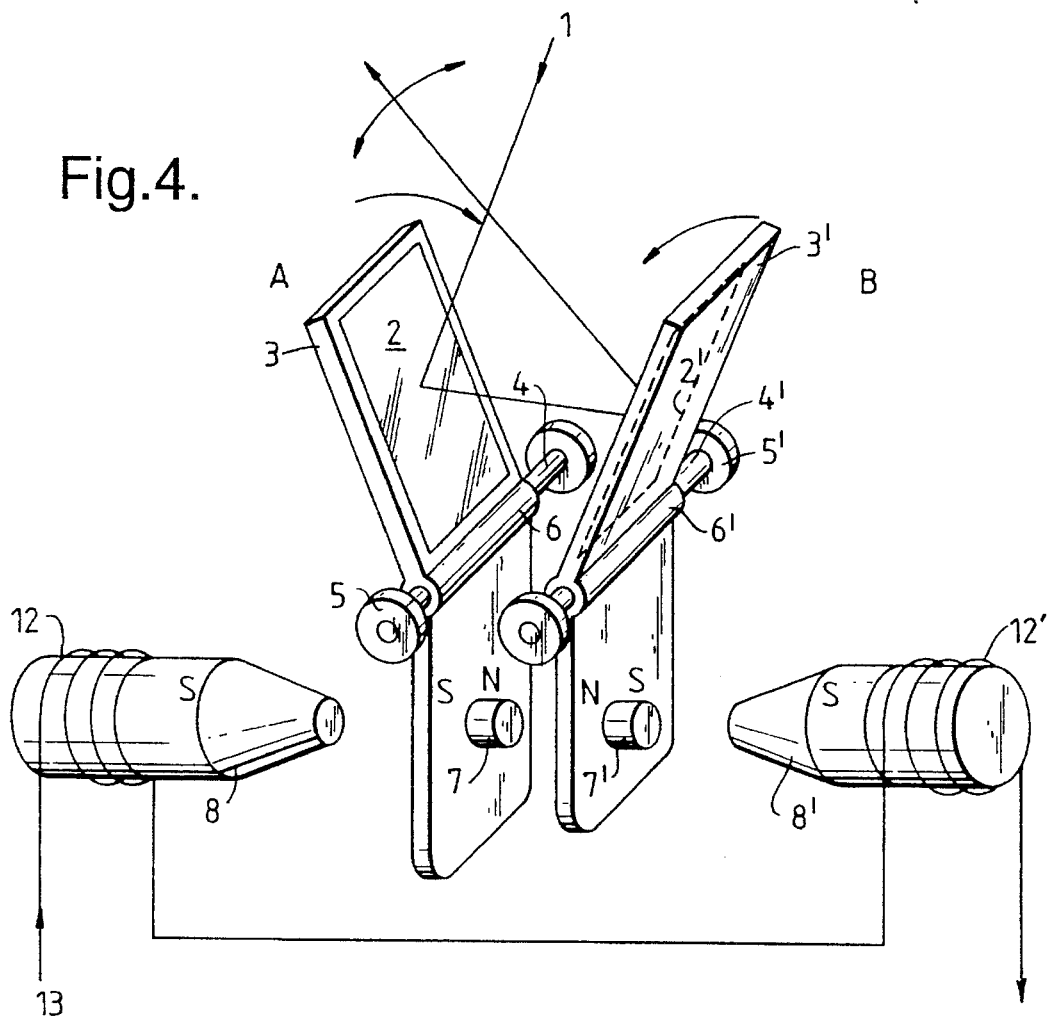
FIG. 4 shows a perspective view of a scanning device using two matching oscillation mirrors.

FIG. 4 shows the working principle of an oscillation system with two matching oscillation mirrors that extend the scan angle. This system consists of two sets of oscillation devices A and B. The light, 1, is first incident on the mirror 2 in the oscillation device A, that is fixed in the holder 3. After reflecting, it is directed to the mirror 21 is fixed in the holder 3' in the oscillation device B. By means of the shaft 4 of the holder 3 and the bearing 5, the mirror 1 can be rotated around the axis 6, while by means of the shaft 4' and the bearing 5', the mirror 2' oscillates around the axis 6'. The permanent magnets 7 and 7' are fixed on the two holders and distanced from the oscillation axes, respectively. They are faced to each other with the poles of the same sign. In this case, the mirror 2 and 2' are forced to be separated by the repulsion forces. To keep the two mirrors at their equilibrium positions, another two stationary magnets 8 and 8' are used and their poles face the poles for the moving magnets with the same sign. Around the stationary magnets, 8 and 8', the coils, 12 and 12' are wound respectively. An alternating current, 13, is fed into the coils 12 and 12', to generate the alternating electro-magnetic torque such that the mirrors 2 and 2' can be shifted away from their equilibrium positions. The phase of the alternative currents in the coil 12 and 12' are chosen such that the mirror 2 and 2' will be rotated around their corresponding axes in two opposite directions. Combining the driving and elastic torques, the mirrors oscillate. When the frequency of the driving current is matched to the resonant frequency of the elastic system, the angle between the two mirrors will arrive at its maximum and its power consumption is minimized.

For this device, the resonant frequency of the device A and B must be identical. To control the frequency for A and B, separately, it is better to use separate driving magnets and elastic magnets instead of the above-mentioned stationary magnets, which is not shown here.

Instead of the oscillating scanning devices, based upon the first embodiment in the present dual oscillation system, the second embodiment can also be used to make such a dual mirror system, which we will not present here.

II. Bar code readers.

Based upon these oscillation devices, various bar code readers can be built.

2-1 Active bar code readers

Figure 5:
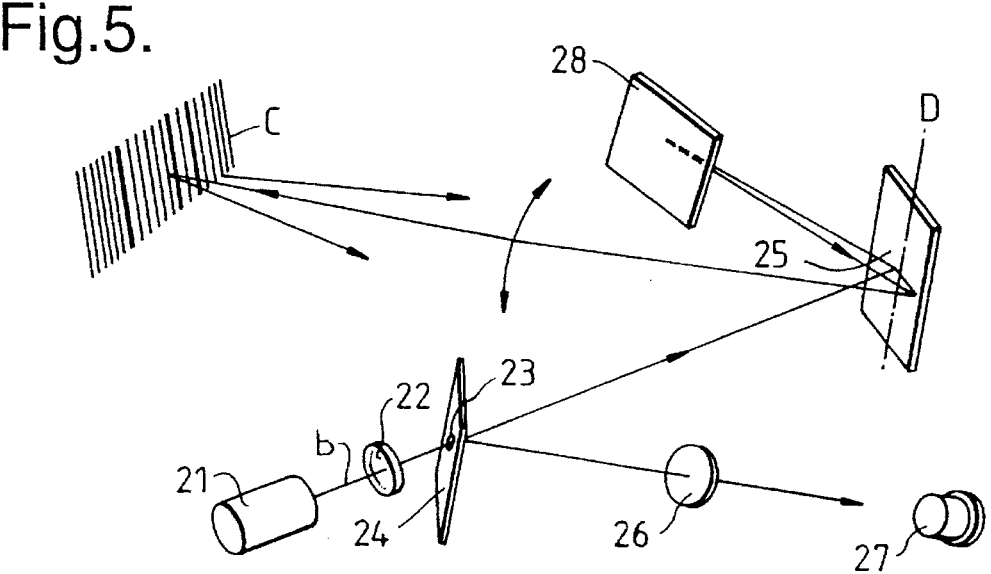
FIG. 5 shows a schematic view of an active bar code reader which can use any of the above devices.

FIG. 5 shows a typical one-dimensional laser scanner in which the magnetic elastic components have been used. The beam, b, from the laser 21, is focused by the optics 22 through the hole 23 in the mirror 24 to the bar code C. This beam is steered by the mirror 25 in the scan device D. The light, scattering from bar code, is reflected by the mirrors 25 and 24 to the light collector 26. By this collector the light is detected by the photo-sensor 27. The scan device D in this figure can be one of the above described devices.

In the present scanner an additional mirror 28 can be used to project the laser beam from the scan device back to the mirror 25 again. The re-reflected laser beam from this mirror will increase the scan angle twice. The scan angle is also increased with the increasing re-reflection times on the scan mirror 25.

Figure 6:
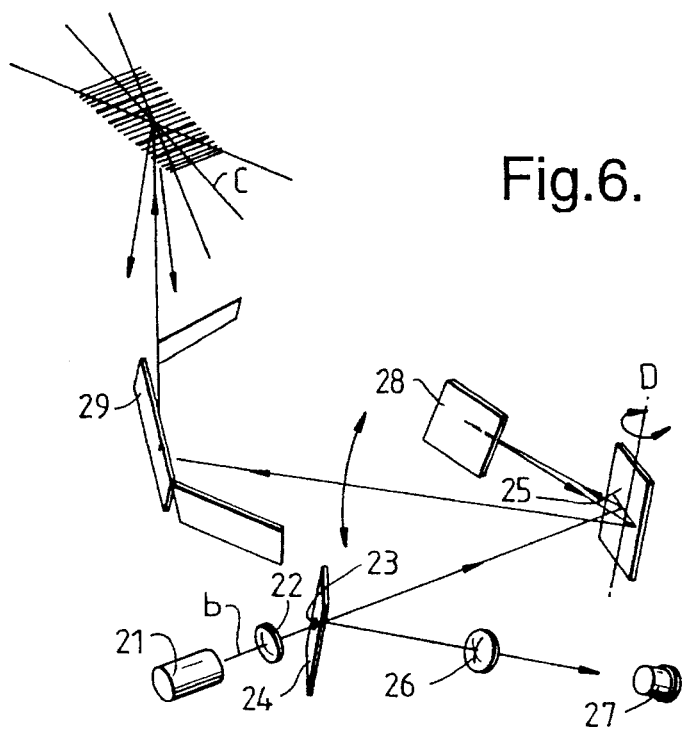
FIG. 6 shows a schematic view of another active bar code reader.

Using additional optical components, the one-dimensional scanning can be extended to become multiple-direction scanning. As shown in FIG. 6, the laser beam from the oscillation mirror 25 is directed to the mirror array 29, which surrounds this vibration mirror. Reflected by the facets in this array, the laser beam will scan the bar code C. The two-dimensional scan pattern depends on the number, sizes and orientations of facets in the mirror array.

2-1 Passive bar code reader

Figure 7:
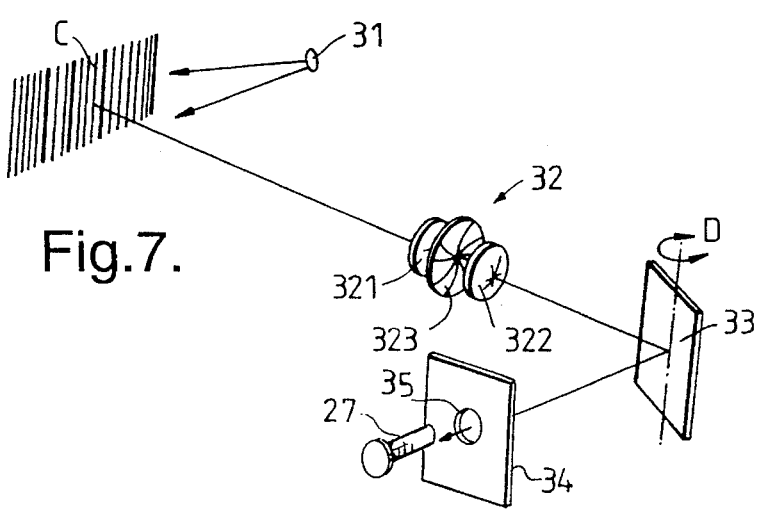
FIG. 7 shows a schematic view of a passive bar code reader.

A typical passive bar code reader is shown in FIG. 7. The bar code to be read is illuminated by the ambient light or an additional non-coherent light source 31. The illuminated bar code is imaged by the optics 32, consisting of a set of lenses 321 and 322 and a diaphragm 323. This image is reflected by the oscillation mirror 33 in the scan device D, which can be any of the above-mentioned oscillation devices, to the imaging plane, in which an opaque screen 34 with a small opening 35 is situated. Behind this opening, a photo-sensor is placed. During vibrating, the image is moved over this screen. Through the opening 35, the bar code signal will be detected. The spatial resolution and the longitudinal working range of the bar code reader depend on the diaphragm and the pin-hole.

I claim:

1. A bar code reader comprising optical scanning means which is arranged to provide an optical image of a bar code by means of an optical beam, and includes optical beam deflecting means which is arranged to oscillate at a resonant frequency so as to deflect the optical beam in a scanning motion to provide the optical image of the bar code, light detecting means by which the optical image of the bar code can be received and formed into an electrical signal, and decoding means for decoding the electrical signal, the said optical beam deflection means comprising magnetic force applying means and magnetic restorative means which are arranged to act against each other to provide oscillation and at least one of which is arranged to deflect the beam in said scanning motion and magnetic means for adjustment of the resonant frequency of oscillation.

2. A bar code reader according to claim 1 which is an active scanner including means for generating a light beam to be focused on the bar code so as to scan the bar code for subsequent decoding.

3. A bar code reader according to claim 1 which is a passive scanner including means for provision of an optical path scanning an illuminated bar code for subsequent decoding.

4. A bar code reader according to claim 1 in which the magnetic means for adjustment of the resonant frequency of oscillation comprises an electro magnetic coil associated with the magnetic force applying means and with the magnetic restorative means.

5. A bar code reader according to claim 1 in which the magnetic force applying means comprises an electro-magnet and means for application of an alternating current to said electro-magnet.

6. A bar code reader according to claim 1 in which the magnetic restorative means is a permanent magnet.

7. A bar code reader comprising optical scanning means which is arranged to provide an optical image of a bar code by means of an optical beam, and includes optical beam deflecting means which is arranged to oscillate at a resonant frequency so as to deflect the optical beam in a scanning motion to provide a time sequential optical image of the bar code;

light detecting means by which the optical image of the bar code can be received and formed into an electrical signal, and decoding means for decoding the electrical signal, said optical beam deflection means comprises magnetic force applying means in the form of an A.C. excited electro-magnet and magnetic restorative means in the form of a permanent magnet which means are arranged to act against each other to provide oscillation and to deflect the beam in a scanning movement.

and magnetic means for adjustment of the resonant frequency of oscillation.

8. A bar code reader according to claim 7 comprising a pair of opposed mirrors which are arranged to provide sequential reflection of the optical beam so that during oscillation a wide scan angle is provided and that each mirror is arranged to oscillate with a resonant frequency which is the same as the other said mirror.

* * * * *